UNITED STATES PATENT OFFICE.

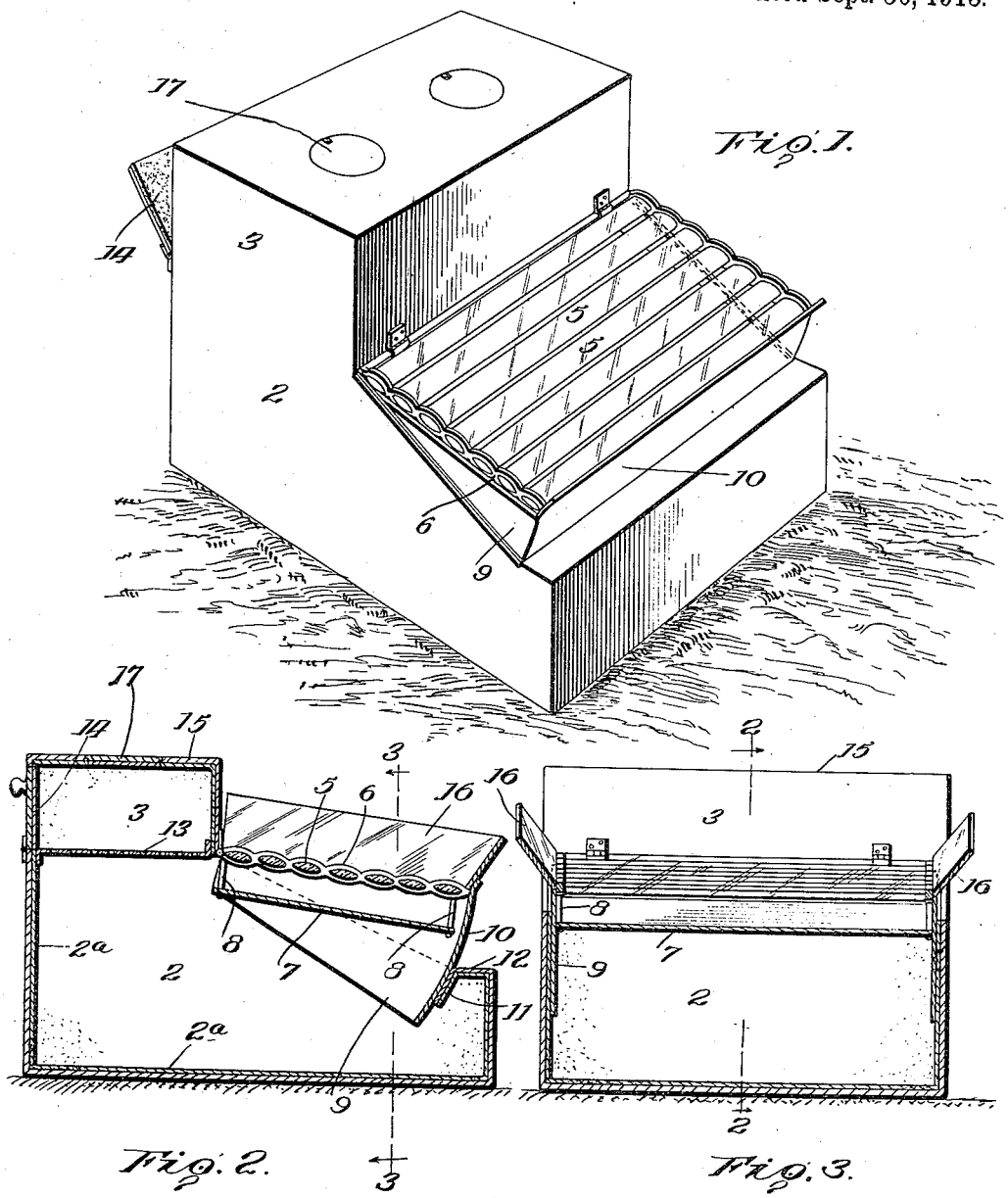

FREDERIC A. SKIFF, OF PAXTON, MASSACHUSETTS.

SOLAR HEATER.

1,074,219.     Specification of Letters Patent.     Patented Sept. 30, 1913.

Application filed March 22, 1912. Serial No. 685,522.

*To all whom it may concern:*

Be it known that I, FREDERIC A. SKIFF, a citizen of the United States, residing at Paxton, in the county of Worcester and State of Massachusetts, have invented certain new and useful Improvements in Solar Heaters, of which the following is a specification.

My invention relates to heaters, and particularly to means for conserving and utilizing the heat of the sun.

The primary object of my invention is the provision of a solar heater of a particularly cheap and simple construction adapted to be used for domestic purposes, as for instance for cooking, heating water, or even for heating a room.

A further object is to provide a solar heater using lenses for concentrating the heat of the sun, the lenses being of such form as to concentrate the rays of the sun in longitudinally extending lines instead of concentrating the rays at isolated points.

A further object is to provide a solar heater of the character described and carrying a bank of lenses having a heat absorber disposed below the lenses and consisting of a sheet of black metal such as iron upon which the concentrated heat rays will be received, this sheet of metal acting to uniformly heat the air in the body of the heater.

A further object is to provide means whereby the angle of the bank of lenses can be changed to suit the declination of the sun.

My invention is illustrated in the accompanying drawings wherein:

Figure 1 is a perspective view of a solar heater constructed in accordance with my invention. Fig. 2 is a transverse section on the line 2—2 of Fig. 3. Fig. 3 is a vertical section on the line 3—3 of Fig. 2.

Referring to the drawings, 2 designates a box or casing preferably made of sheet metal, such as sheet iron, the box or casing being formed at one side with an upwardly extending portion 3 constituting an oven. The box or casing in front of the oven is open at its top, and disposed in this opening is a bank of lenses 5. These lenses as illustrated are relatively long and relatively narrow and are supported side by side in parallel relation within end frames 6 of any suitable construction.

Supported below the lenses and preferably supported in fixed relation thereto by being attached to the lens frames, is a heat absorber consisting in this instance of a plate of metal designated 7, preferably a plate of black iron. This iron may be coated, if desired, with some heat absorbing material such as lamp black. I do not wish to limit myself to the particular material for this heat absorbing plate as it is obvious that many different materials might be used for the purpose. This plate as illustrated is supported by means of downwardly extending rods or bolts 8 which extend from the end frames. The end walls of the casing 2 extend upward above the plate 7 and up to the line of lenses. The end frames supporting the lenses carry downwardly extending wings designated 9 which fit inside the end walls so as to prevent any escape of the heated air. The frames supporting the lenses are hinged at their rear ends to the front wall of the upwardly extending portion 3 so as to permit the bank of lenses to be adjusted at any desired angle to suit the inclination of the sun's rays. Thus when the sun is in the zenith, the lenses are placed in a horizontal plane and as the sun declines, the bank of lenses may be shifted.

The forward edge of the lens frame carries a curved plate designated 10 which coacts with and frictionally fits against a curved plate designated 11 carried by an inwardly extending flange 12 on the front wall of the casing 2. The interior of the casing is preferably lined with asbestos or other non-conducting material 2ᵃ so as to prevent any radiation of the heated air within the casing and causing the heat to pass upward into the extension 3 which as before stated forms the oven.

The extension 3 is provided with a shelf designated 13 which may be either perforate or imperforate as desired, but which is preferably perforated. The outer wall of the oven is formed by a door 14 which is hinged or otherwise attached to the main wall of the casing so that access may be gained to the oven. Furthermore, this door 14 permits the heated air contained within the oven to pass out through the opening and be diffused throughout a room if it is desired to heat the room.

With the construction as above described, sufficient heat may be gained to do certain kinds of cooking, the food to be cooked being subjected to the action of the heat for a relatively long period. The top 15 of the extension 3 may be used for heating water or for cooking, if desired.

In addition to the parts previously described, I prefer to use a metal reflector having a form in plan the same as that of the casing and surrounding the lens frame. These metal reflectors preferably have an angle of 45° and are designated 16 in the drawing. I have illustrated the use of lenses as a means of concentrating the heat of the sun upon the absorbing plate beneath.

It will be observed that the space between the lenses 5 and the heating plate 7 is open at top and bottom into the interior of the casing 2 so that the air heated by contact with the plate 7 will pass upward between the plate and the lenses and into the extension 3 and the relatively unheated air in the casing 2 will also be carried upward and enter the space between the lenses and the heating plate at the lower end of the heating plate. Thus a continued circulation of the air within the casing is secured, and as the interior of the casing is lined with asbestos or like material and very little of the heat escapes from the casing, the temperature of the contained air will be readily raised to a relatively high point.

In order that vessels may be set upon the stove to be heated, I preferably form the upper end plate of the extension 3 with lids 17 like stove lids which may be inserted or removed, these lids of course being lined on their interior with asbestos. I do not wish to limit myself, however, to any specific construction for this portion of the stove, nor to any particular form for the lenses, though the elongated lenses illustrated are of particular effectiveness.

What I claim is:

1. A solar heater of the character described, comprising a relatively fixed box or casing closed at its sides, end and bottom but open at the top, a frame hinged to the casing and forming a top thereto, glass carried upon said frame and extending across the top of the casing, and a heating plate supported upon said frame in rigid relation to the glass thereof and parallel thereto, said heating plate being disposed within the casing and the inclination of the heating plate being adjustable with the glass supporting frame.

2. A solar heater of the character described, comprising a box or casing, a glass supporting frame hinged to said casing for movement in a vertical plane a glass supported on said frame and closing the open top of the casing, said glass supporting frame being adjustable as to inclination, depending supports extending from the glass supporting frame into the box or casing, a heating plate mounted on said depending supports in rigid relation to the glass supporting frame but movable therewith, end plates carried by the supporting frame and extending down into and contacting with the side walls of the casing, and a plate attached to the free edge of the frame and extending into and contacting with the front wall of said casing.

3. A solar heater of the character described, comprising a metallic box or casing having an upward extension at one side forming an oven, the top of the casing in front of said extension being open, lens frames hinged to the front wall of the upward extension, lenses supported in said frames and closing the open top of the casing, said lenses and lens frames being adjustable as to inclination, depending supports extending from the lens frames into the box or casing, and a heating plate mounted on said depending supports in rigid relation to the lenses.

4. A solar heater of the character described, comprising a metallic box or casing having an upward extension at its rear side constituting an oven, the top of the casing in front of the extension being open, lens frames mounted in the open top of the casing and lenses supported on the lens frames, said lens frames being hinged to the front wall of the extension, a curved plate extending transversely and attached to the free end of the lens frames, a curved plate supported on the front wall of the casing and coacting with the first named curved plate, depending supports extending from the lens frames into the casing, a heating plate mounted upon said depending supports in fixed relation to the lenses, a door closing the rear wall of the extension, and a shelf separating the main body of the casing from said extension.

In testimony whereof I affix my signature in presence of two witnesses.

FREDERIC A. SKIFF. [L. S.]

Witnesses:
 INEZ F. PENNIMAN,
 ANNA I. BIGELOW.